No. 813,136. PATENTED FEB. 20, 1906.
S. W. BALCH.
TROPOSCOPE.
APPLICATION FILED MAY 11, 1905.
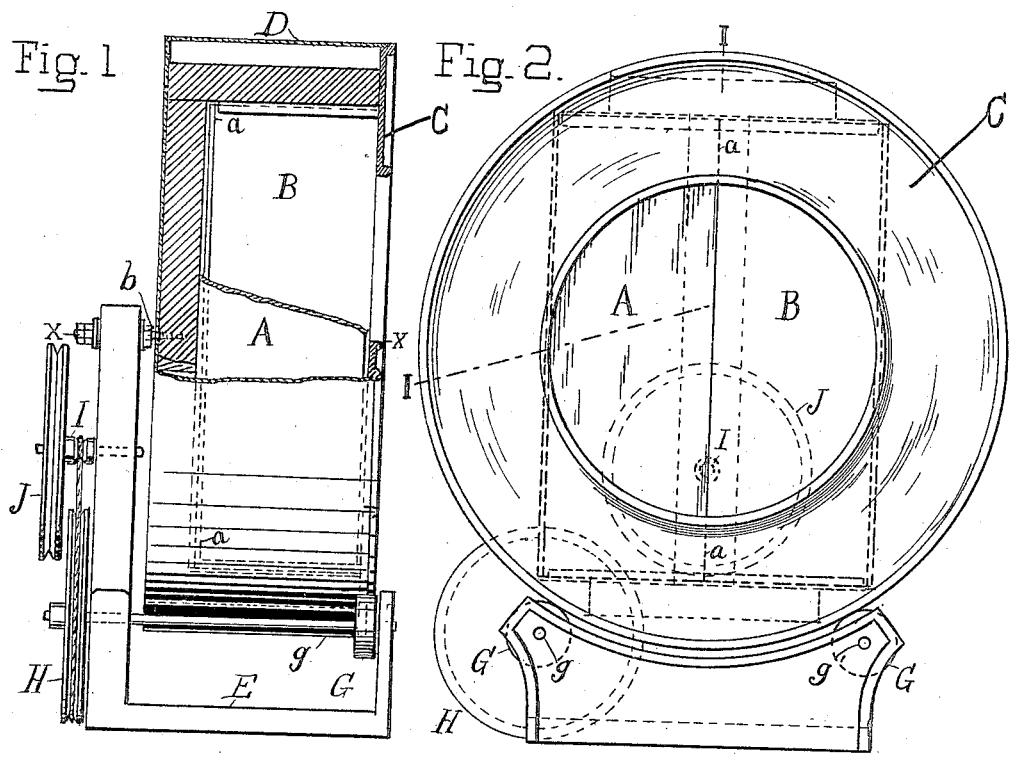
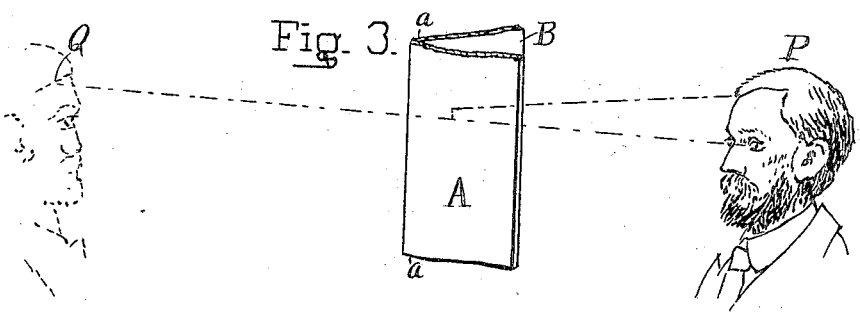
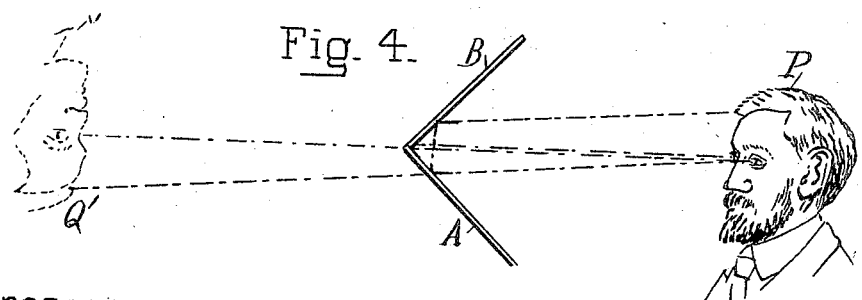
Witnesses:
Inventor,
Samuel W. Balch

UNITED STATES PATENT OFFICE.

SAMUEL W. BALCH, OF MONTCLAIR, NEW JERSEY.

TROPOSCOPE.

No. 813,136.     Specification of Letters Patent.     Patented Feb. 20, 1906.

Application filed May 11, 1905. Serial No. 260,041.

*To all whom it may concern:*

Be it known that I, SAMUEL W. BALCH, a citizen of the United States of America, and a resident of Montclair, in the county of Essex and State of New Jersey, have invented certain new and useful Improvements in Troposcopes, of which the following is a specification.

This invention relates to an arrangement of two mirrors set at right angles to each other with an edge of one mirror meeting the other and arranged for rotation about an axis perpendicular to the line along which the mirrors meet and bisecting the right angle of the mirrors.

The object of the invention is to produce a device which when placed in connection with advertising matter or goods displayed for sale, as in a show-window, will attract attention by reason of the peculiar effects produced as the device is rotated about its axis.

This invention is also useful as a novelty in connection with shows and other amusements.

In the accompanying sheet of drawings, which forms a part of this application, Figure 1 is a slide elevation, broken away on the line I I of Fig. 2, of the device embodying my invention. Fig. 2 is a front view. Fig. 3 is a diagram illustrating the phenomena of reflection when the device occupies a position with the mirrors vertical. Fig. 4 is a diagram illustrating the phenomena of reflection when the device occupies a position with the meeting line of the mirrors horizontal.

The device comprises two plane mirrors A B, set at right angles to each other with the straight edge of one of the mirrors meeting the other mirror along the line *a a*. These mirrors are mounted behind the frame C with the meeting line of the mirrors opposite the middle of the opening in the frame and parallel with the face of the frame. By reason of the circular outline of the frame and by reason of its being pivoted at the rear at *b* it is constructed so that it can be readily revolved about an axis *x x* perpendicular to the meeting line of the mirrors and to the face of the frame at the middle of the opening through the frame. I preferably inclose the mirrors in a light cylindrical casing D, so that the exterior appearance of the frame as a whole is cylindrical. The frame is supported from a base E, preferably by the pivot *b* and also on wheels G G, mounted on axles *g g'*, journaled in the base, which support the cylindrical surface; but either of these means of support may be used alone. A large pulley-wheel H is attached to one of the axles *g* and belted from a smaller pulley I, the pulley I being joined to a large pulley J and the latter driven by any convenient source of power, as by an electric motor. By this means the mirror-frame may be rotated slowly, so that about a minute will be required for a revolution. Advertising matter may, if desired, be placed on the face and sides of the mirror-frame and on the base.

The device is preferably exhibited in a store-window and so placed that the axis will be about on a level with the average height of the eyes of people standing outside the window. When the mirrors are vertical, as illustrated in Figs. 1 and 2 and in the diagram Fig. 3, one's face is reflected when standing opposite very much as though looking into an ordinary mirror, the difference, which, however, would not always be noticed, being that one sees himself right side to, as shown in an ordinary photograph which is printed from a negative and as he appears to others instead of reversed, as he appears to himself in an ordinary mirror. This is illustrated in the diagram Fig. 3, in which a ray of light from the right side of a person P falls on the mirror B and is then reflected to the mirror A and from thence to the left eye, so that the right side is seen by the left eye on the side of that eye as though it were at Q. When the mirror-frame has been rotated through a quarter of a revolution, so as to bring the meeting line of the mirrors into a horizontal position, a person P will then, as illustrated in Fig. 4, see himself upside down, as though at Q'. In this case a ray from the top of the head falling on the mirror B is reflected to the mirror A and thence in an upwardly direction to the eye. At the same time a ray from the eye would fall on the mirrors A or B close to the meeting line of the mirrors reflected from one to the other and thence back to the eye, so that the eye would be seen on a line passing through the meeting line of the mirrors, and hence above the top of the head. The image thus rotates through one hundred and eighty degrees with a rotation of the device of ninety degrees, and hence makes two complete revolutions to each revolution of the mirror-frame. This arrangement of mirrors at right angles with the mirrors vertical is also useful in studios for artists and photographers to satisfy their patrons of the accuracy of the portraits, for faces are rarely symmetrical and the idea which one gains of one's own appearance from an ordinary mirror is erroneous, owing to the fact that the mirror reverses and does not show the face as it looks to other people. When the mirrors are utilized for this purpose and more accuracy is desirable, the mirrors are silvered on their faces instead of on their backs, as ordinarily, so that the rays of light do not pass through the glasses of the mirrors and are not subject to the distortion arising from the refraction of the glasses.

What I claim as new, and desire to secure by Letters Patent of the United States, is—

1. The combination with a rotatably-mounted circular frame provided with an opening, of two plane mirrors set at right angles to each other with the straight edge of one of the mirrors meeting the other mirror and the meeting line of the mirrors opposite the opening in the circular frame, whereby the mirrors can be conveniently rotated about an axis perpendicular to the meeting line and the face of the frame, substantially as described.

2. The combination with a frame provided with an opening, of two plane mirrors set at right angles to each other with the straight edge of one of the mirrors meeting the other mirror and the meeting line of the mirrors opposite the opening in the frame, and a pivoted support for the frame, the axis of which is perpendicular to the meeting line of the mirrors and the face of the frame, substantially as described.

3. The combination with a circular frame provided with an opening, of two plane mirrors set at right angles to each other with the straight edge of one of the mirrors meeting the other mirror and the meeting line of the mirrors opposite the opening in the circular frame, and a pivoted support for the frame, the axis of which is perpendicular to the meeting line of the mirrors and the face of the frame, substantially as described.

4. The combination with a circular frame provided with an opening, of two plane mirrors set at right angles to each other with the straight edge of one of the mirrors meeting the other mirror and the meeting line of the mirrors opposite the opening in the circular frame, and means for rotating the mirrors about an axis perpendicular to the meeting line and face of the frame, substantially as described.

Signed by me at New York, N. Y., this 10th day of May, 1905.

SAMUEL W. BALCH.

Witnesses:
  CHAS. J. WOLF,
  HUGH H. SENIOR.